United States Patent [19]

Miyanaga

[11] 4,408,935

[45] Oct. 11, 1983

[54] METAL BORER

[75] Inventor: Masaaki Miyanaga, Ashiya, Japan

[73] Assignee: Kabushiki Kaisha Miyanaga, Hyogo, Japan

[21] Appl. No.: 242,465

[22] Filed: Mar. 11, 1981

[30] Foreign Application Priority Data

Dec. 10, 1980 [JP] Japan .................................. 55-174956

[51] Int. Cl.³ ............................................. B23B 41/02
[52] U.S. Cl. ....................................... 408/206; 408/56
[58] Field of Search ............... 408/204, 205, 206, 703, 408/56

[56] References Cited

U.S. PATENT DOCUMENTS

| | | | |
|---|---|---|---|
| 765,877 | 7/1904 | Brownstein | 408/56 |
| 3,308,689 | 3/1967 | MacDonald | 408/204 |
| 3,592,554 | 7/1971 | Takahara | 408/204 |
| 3,609,056 | 9/1971 | Hougen | 408/204 |
| 3,765,786 | 10/1973 | Hougen | 408/204 |
| 3,825,362 | 7/1974 | Hougen | 408/204 |
| 4,129,401 | 12/1978 | Berthier | 408/703 |

FOREIGN PATENT DOCUMENTS 1201585 8/1970 United Kingdom ................ 408/204

*Primary Examiner*—Leonidas Vlachos
*Attorney, Agent, or Firm*—Merriam, Marshall & Bicknell

[57] ABSTRACT

This disclosure relates to a tool for boring or drilling holes in relatively hard, thick material such as sheet steel. The borer includes a tubular, cylindrical part having cutting teeth on one end edge. The borer part is designed to be rotated on its tubular axis and to be advanced in a forward direction to move the teeth against the material to be bored. The teeth are circumferentially spaced and are, alternately, inner cutting teeth and outer cutting teeth. The teeth are formed at the leading corners of radially thickened portions of the part, and channels or grooves are formed between the spaced teeth for the efficient removal of shavings. The teeth cut an annular groove, the inner teeth cutting at the radially inner corner of the groove and the outer teeth cutting at the radially outer corner of the groove.

1 Claim, 12 Drawing Figures

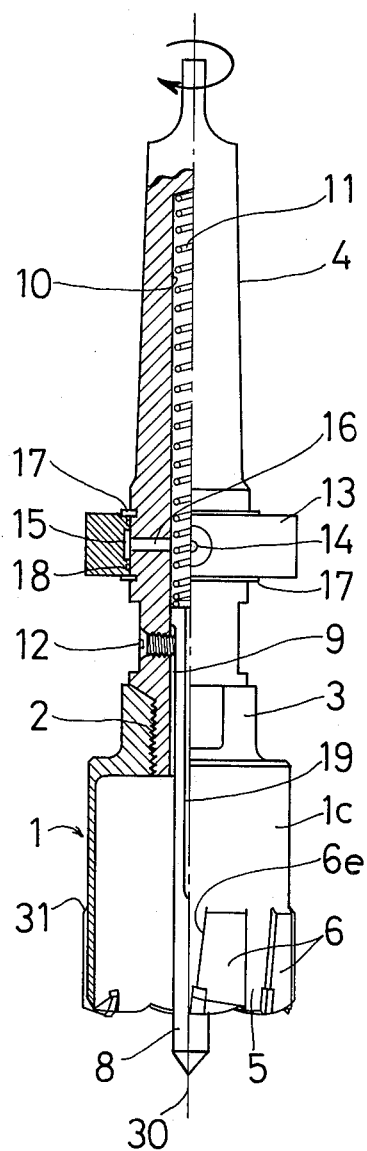
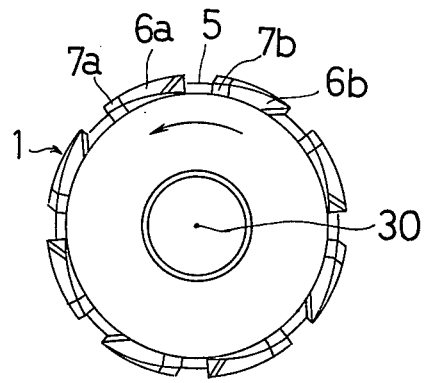
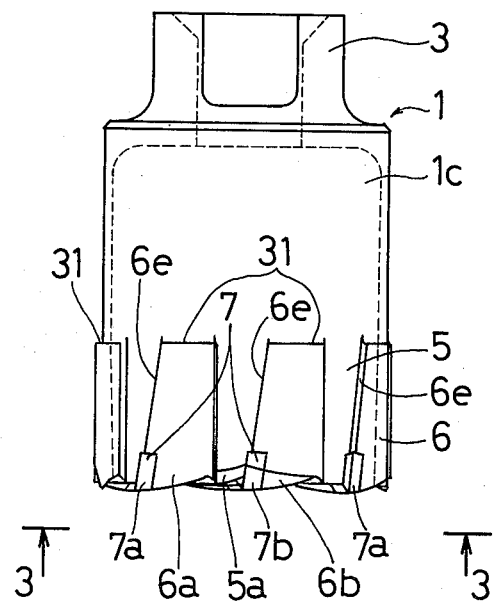
FIG. 1
FIG. 3
FIG. 2

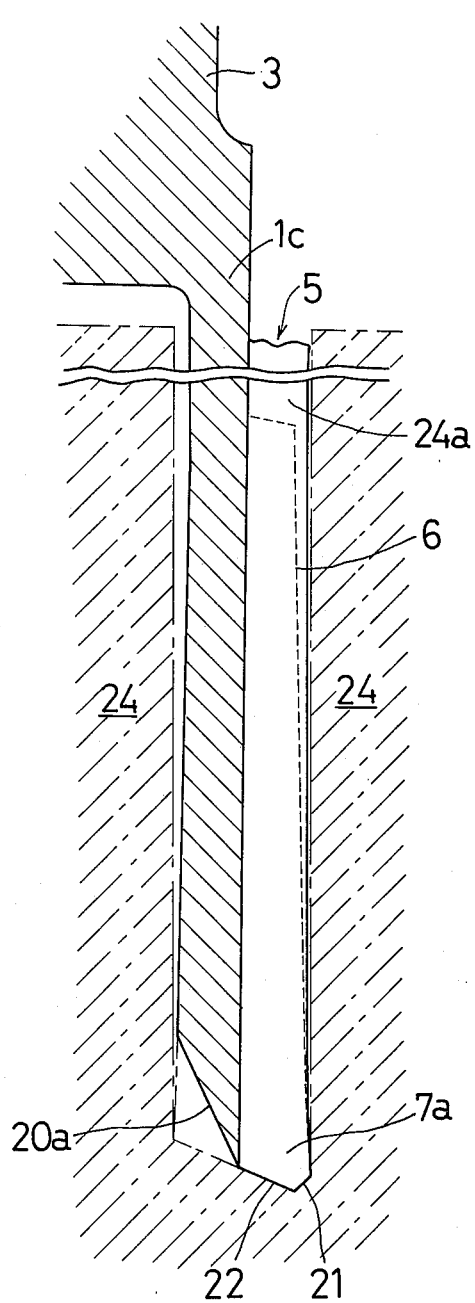
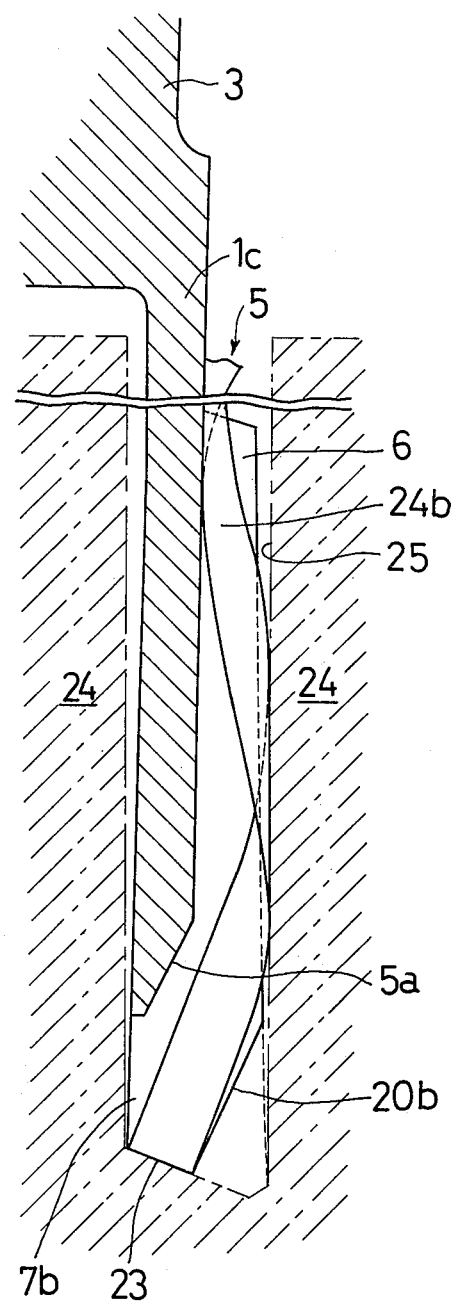
FIG. 5(a)
FIG. 5(b)

METAL BORER

Various devices are known in the art for cutting holes in relatively thick metal. U.S. Pat. No. 3,765,789 shows an annular hole cutter, and core drills are also known.

Generally, when drilling a hole in sheet metal using a conventional core drill, long continuous metal shavings are removed from the sheet. Such shavings often curl and cannot easily be removed from the drilled hole, and consequently soon after the drilling operation starts, the shavings and chips gather in front of the cutting edges and increase the resistance to drilling. This action prevents drilling through thick sheets, and in addition the shavings and chips in the drilled hole may damage the borer if the drilling operation is continued.

In addition, core drills have conventionally been provided for drilling relatively large diameter holes through relatively thick aluminum and other soft metal sheets. Such drills have a cylindrical or tubular blade formed with wide axially extending grooves through its peripheral wall along most of its length for removing scraps from the hole. Such core drills, however, are not strong enough to drill hard metal sheets.

It is a general object of this invention to provide a cutter or borer for drilling large-diameter holes through steel or other hard metal sheets, as well as other types of material, such sheets being for example 25 millimeters or more thick. A metal cutter or borer in accordance with this invention comprises a cylindrical body open at its forward end, said body being formed with a plurality of channels in its outer cylindrical surface, each of said channels being open at forward end of the body and also open rearwardly. Between the channels are spaced blade portions, each of said portions having a cutting tooth projecting from its forward end. Some of the cutting teeth have an inner end wall cut off to form an outer tooth, and the remaining teeth have an outer, forward end wall cut off to form an inner tooth.

A preferred embodiment of this invention will be better understood from the following detailed description and with reference to the accompanying drawings, wherein:

FIG. 1 is a side view partially in axial section of a borer constructed in accordance with this invention;

FIG. 2 is an enlarged elevational view of the cylindrical body part of the borer;

FIG. 3 is a view taken on the line 3—3 of FIG. 2;

Figure 4:
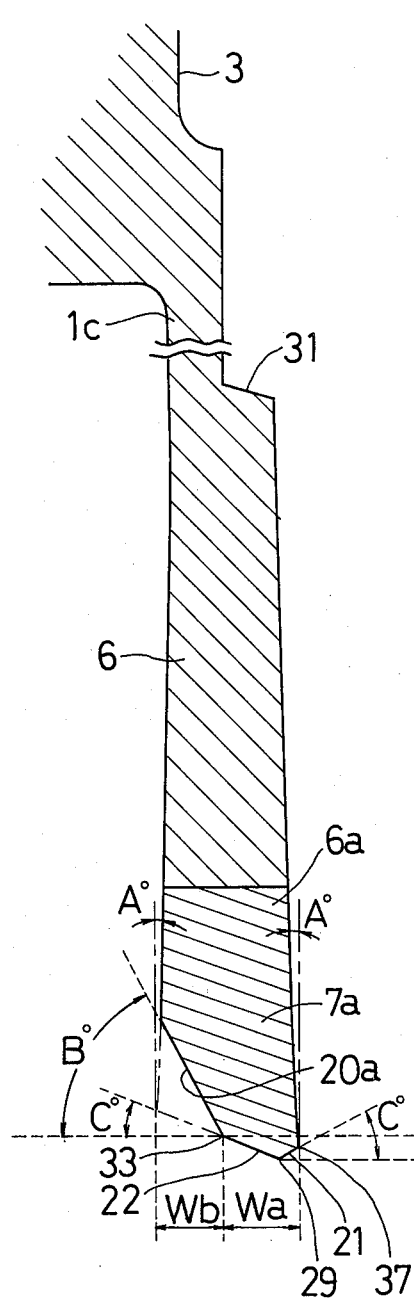
Figure 4:
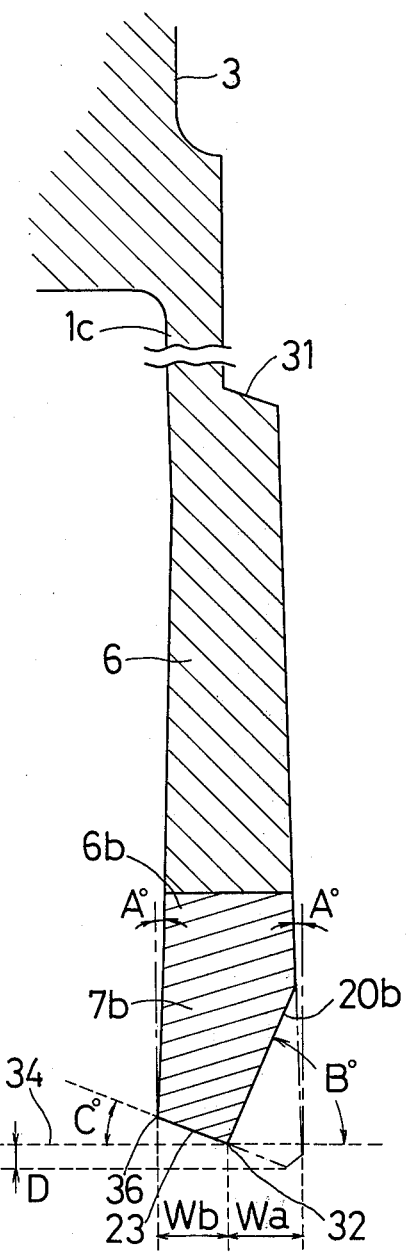
Figure 6:
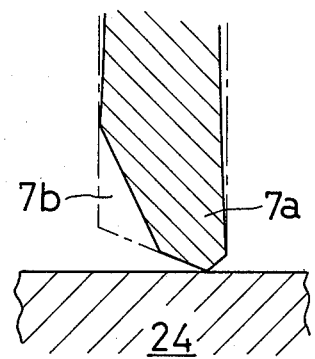
Figure 6:
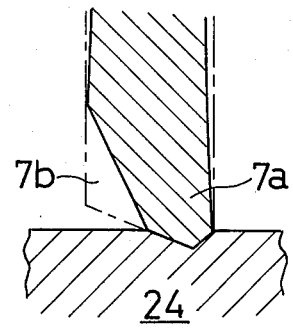
Figure 6:
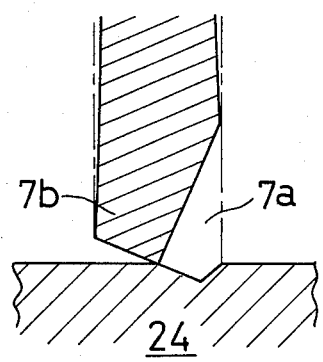
Figure 6:
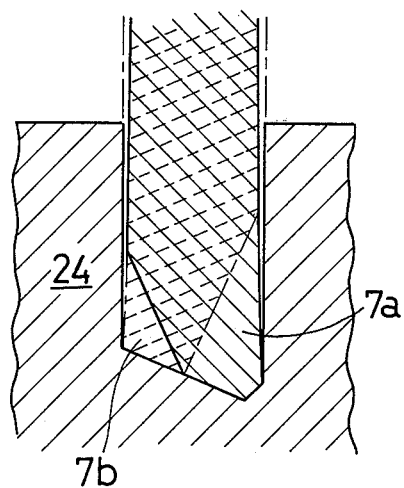
Figure 6:
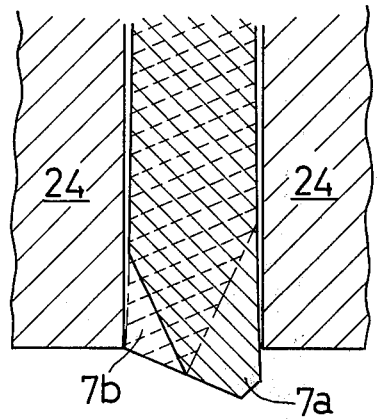

FIGS 4(a) and 4(b) are fragmentary enlarged views in section of the cylindrical body part;

FIGS. 5(a) and 5(b) are views similar to FIGS. 4(a) and 4(b) but showing the borer during operation; and FIGS 6(a)–6(e) are fragmentary enlarged views in section showing the cutting teeth of the borer in a sequence of stages of operation.

Referring to the drawings, apparatus comprising the invention includes a cylindrical drill body 1 which is open at its forward or bottom end and has an integral collar 3 at its other or upper end. The collar 3 is formed with an interior thread 2 which is threadedly engaged by a driving shank 4.

The drill body 1 includes an intermediate tubular part 1c having a uniform, relatively thin wall that is parallel to the axis 30 of rotation of the body 1 and the shank 4. At the forward end of the body 1, it is radially outwardly enlarged or thickened at regularly spaced intervals. The thickened parts form an even number of angularly spaced blade portions 6 which form angularly spaced recesses or channels 5 between them. The outer surface of the body 1 has spaced shoulders 31 (FIGS. 1, 2, 4a and 4b) which form the enlarged blade portions 6. As best shown in FIGS. 4(a) and 4(b), the inner and outer wall surfaces of the blade protions 6 are tapered at an angle A, such that the portions 6 are thickest at their forward ends and become gradually thinner in the upward direction.

The outer surfaces of the body 1 in the channels or recesses 5 are continuations of the outer cylindrical surface of the tubular part 1c of the cylinder 1 (see FIG. 1). The body 1 is designed to be rotated in the clockwise direction, and the leading side or edge 6e of each blade 6 is angled rearwardly and upwardly so as to gradually widen the channel 5 in the upward direction.

Each blade portion 6 has a cutting tooth 6a or 6b (FIG. 2) projecting downwardly or forwardly beyond the forward end of the grooves 5, adjacent the leading edge 6e. A super hard metal alloy cutting tip 7 is secured as by welding to the forward end of each blade portion 6 where the leading edge 6e meets the forward end.

The forward end of each tooth 6a and the attached tip 7 are cut away at their inside corners as indicated at 20a (FIG 4(a)) while each tooth 6b and the associated tip 7 are cut away at their outside corners as indicated at 20b (FIG. 4(b)). The sides 20a and 20b are sharpened and are angled at B degrees relative to a radial plane, thus forming an outer tooth 6a and tip 7a and an inner tooth 6b and tip 7b as shown in FIGS. 2 and 3, the outer teeth 6a and inner teeth 6b alternate around the circumference of the forward end of the body 1.

As shown in FIGS. 4(a) and 4(b), the forward end of each outer tooth 6a is also sharpened at both the outer and inner sides 21 and 22 at C degrees to a radial plane of the cylinder 1, and the forward end of each inner tooth 6b is sharpened at its inner side 23 also at C degrees. The forward end of each outer tip 7a projects forwardly or axially beyond the forward end of each inner tip 7b by a distance D. The sides 21 and 22 meet and form a circumferential forward edge 29 and the sides 23 and 20b meet and form a circumferential edge 32. Further, the sides 20a and 22 meet and form a circumferential edge 33 which should lie in the same radial plane 34 as the edge 32. The radial distance Wb (FIG. 4(b)) between the sharp forward edge 32 and the innermost edge 36 of the inner tip 7b should be approximately equal to the distance Wa (FIG. 4(a)) from the edge 33 to the outermost edge 37 of the outer tip 7a. The edge 33 is in the same radial plane as the forward end 32 of the inner tip 7b. The above distances Wa and Wb are approximately half the thickness of the portions of the tips 7a and 7b which are above the sharpened ends as shown in FIGS. 4a and 4b, the contours of the inner and outer cutting teeth are formed by straight lines and angles, and all of the angles obtuse (i.e. between 90° and 180°).

The forward ends 5a (FIGS. 2 and 5(b)) of the recessed portions 5 of the cylinder 1, in front of the inner tips 7b are relieved or tapered at their outside and forward corners.

The shank 4 has a central bore 10 which is open at its forward end and closed at its rearward end. A pointed centering pin 8 slides within the bore 10 and is biased forwardly by a compression spring 11 so that its pointed end normally projects beyond the forward end of the cutting teeth 6a and 6b. The pin 8 has an axial groove 9 in slidable engagement with a set screw 12 secured to the shank 4 so that the pin 8 rotates with the shank 4 but is prevented from moving out of the bore 10.

A lubricant supply means is preferably provided in the shank 4 for lubricating and cooling the cutting teeth when drilling sheet metal. Such means includes an annular member 13 (FIG. 1) rotatably mounted on an intermediate portion of the shank 4 and axially held in place between a pair of snap rings 17. Oil is supplied through a radial hole 14 and an inner annular groove 15 of the annular member 13, and a radial hole 16 in the shank 4 leads to the bore 10. Two O-rings 18 seal the groove 15. The center pin 8 has another axial groove 19 formed in its outer surface from its upper end forwardly to a level which is below the shank 4, thereby to place the interior of the cylinder 1 in communication with the portion of the bore 10 which is rearwardly of the pin 8. Thus, the cooling lubricant flows through the holes 14 and 16, the groove 19 and reaches the teeth 6a and 6b.

FIGS. 5(a), 5(b) and 6(a) to 6(e) show the borer or core drill in operation. The core drill is rotated by a motor (not shown) connected to the shank 4, and the pointed end of the centering pin 8 is located in a center detent or point on a metal sheet 24, with the pin 8 being forced toward the sheet 24 by the force of the spring 11, thus centering the drill.

The borer is advanced forwardly toward the metal sheet 24 so that the center pin 8 retracts into the bore 10. This causes first the outer teeth 6a and then the inner teeth 6b to bite into the sheet because the edge 29 is in advance of the teeth 6b. At this stage, the lubricant also starts to flow.

Each outer tip 7a (FIG. 5(a)) first bites into the metal sheet 24 and produces an outer substantially straight metal shaving 24a having the radial width Wa; each inner tooth 7b (FIG. 5(b)) subsequently bites into the sheet 24 and produces an inner curled metal shaving 24b having the radial width Wb and being independent from the outer shaving 24a. The two shavings 24a and 24b move rearwardly in separate channels 5.

Since the forward end of each outer tooth 7a is formed with the outer and inner cutting sides 21 and 22 oppositely angled (when viewed in axial section), the metal shaving 24a will proceed approximately straight or axially rearwardly as seen in FIG. 5(a) along the leading edge 6e of the blade 6.

On the other hand, since the forward end of each inner tooth 7b is formed by the single inner cutting side 23 which angles from a radial plane as described, the metal shaving 24b will proceed along the leading edge 6e of the blade 6 but it is first directed at an angle radially outward and rearwardly as shown in FIG. 5(b). The tapered side 5a of the cylinder 1 at its forward end provides clearance for shaving 24b to rise at an angle. The shaving 24b will then strike the outer wall 25 of the drilled hole and curl radially inward, thus rising zigzag between the wall 25 and the outer surface of the cylinder 1 through the channel 5.

Since the blades 6 are thicker at their forward ends, as shown in FIGS. 4(a) and 4(b), the outer and inner walls of each blade 6 are relieved and out of contact with the walls of the drilled hole. This, of course, reduces the cutting resistance to the drill.

Although the metal shavings 24a and 24b may twist or curl, each shaving moves out through its separate channel 5 smoothly without interference by other shavings. Furthermore, since each channel 5 gradually widens in the rearward direction, each shaving 24a and 24b can easily move up. The radial width of the leading edges 6e (FIG. 2) is approximately equal to the width Wa (FIG. 4(a)) and the width Wb (FIG. 4(b)) so that the shavings cut by the cutting sides can move upwardly along the edges 6e as shown in FIGS. 5(a) and 5(b).

By thus forming the borer with separate inner and outer cutting edges to produce separate outer and inner metal shavings, each of which is, of course, narrower than a single shaving in conventional borers, the peripheral wall of the cylinder 1 can be made solid in the channels 5, as distinct from slots or grooves as are formed through the cylindrical body of conventional borers used with aluminum. The solid wall makes the cylinder strong enough to drill through steel sheets, concrete and other hard materials.

What is claimed is:

1. A borer for making an annular cut in a material, said borer comprising a tubular body that is rotatable on its tubular axis and is movable axially forwardly into the material, a plurality of circumferentially spaced blade portions at the forward end of said body, said spaced blade portions forming generally axially extending channels therebetween, said channels being on the outer side of said body and being open at the forward and rearward ends thereof, each of said blade portions forming a sharpened cutting edge at its corner which is forwardmost and advanced in the direction of rotation, a first plurality of said cutting edges being on the radially inner side only of said blade portions and a second plurality of said cutting edges being on the radially outer side only of said blade portions, adjacent cutting edges of said first plurality having cutting edges of said second plurality therebetween whereby said cutting edges of said first and second pluralities alternate around the circumference of said body, the radial width of each cutting edge on said inner side being substantially equal to the radial width of each cutting edge on said outer side, the axial length of each cutting edge on said outer side being greater than the axial length of each cutting edge on said inner side, each cutting edge on said inner side forming a predetermined angle with respect to a radial plane, and at least a portion of each cutting edge on said outer side forming substantially the same angle with the radial plane, the contours of said cutting edges including straight lines connected by angles, and all of said angles being obtuse.

* * * * *